United States Patent [19]

Bergold et al.

[11] Patent Number: 4,664,844

[45] Date of Patent: May 12, 1987

[54] ANTIFOAMS BASED ON OIL-IN-WATER EMULSIONS

[75] Inventors: Wolfram Bergold, Heidelberg; Jaroslav Melzer, Ludwigshafen, both of Fed. Rep. of Germany

[73] Assignee: BASF Aktiengesellschaft, Ludwigshafen, Fed. Rep. of Germany

[21] Appl. No.: 690,508

[22] Filed: Jan. 11, 1985

[30] Foreign Application Priority Data

Jan. 19, 1984 [DE] Fed. Rep. of Germany ....... 3401695

[51] Int. Cl.$^4$ ................... B01D 19/04; D21H 3/36; C02F 1/52
[52] U.S. Cl. ................... 252/358; 252/321; 162/168.7; 210/750
[58] Field of Search ................ 252/358, 321; 162/168.7; 210/750

[56] References Cited

U.S. PATENT DOCUMENTS

| | | | |
|---|---|---|---|
| 3,697,440 | 10/1972 | Lichtman | 252/358 X |
| 3,793,223 | 2/1974 | Lichtman | 252/358 |
| 4,009,119 | 2/1977 | Poschmann et al. | 252/358 |
| 4,094,812 | 6/1978 | Heyden et al. | 252/358 X |
| 4,208,301 | 6/1980 | Gammon | 252/358 X |
| 4,303,549 | 12/1981 | Boylan | 252/358 X |
| 4,340,500 | 7/1982 | Boylan | 252/358 X |
| 4,341,656 | 7/1982 | Abel | 252/358 X |
| 4,421,666 | 12/1983 | Hempel et al. | 252/358 X |

Primary Examiner—John F. Terapane
Assistant Examiner—Catherine S. Kilby
Attorney, Agent, or Firm—Oblon, Fisher, Spivak, McClelland & Maier

[57] ABSTRACT

In antifoams based on oil-in-water emulsions, the oil phase of the emulsion contains
(a) $C_{12}$–$C_{26}$-alcohols, distillation residues obtained in the preparation of alcohols by an oxosynthesis or by the Ziegler process and/or
(b) fatty acid esters of $C_{12}$–$C_{22}$-carboxylic acids with monohydric, dihydric or trihydric $C_1$–$C_{18}$-alcohols, with or without
(c) a hydrocarbon having a boiling point above 200° C. or fatty acids of 12 to 22 carbon atoms, constitutes from 15 to 60% by weight of the emulsion and has a mean droplet size of from 0.5 to 15 μm. The emulsions are stabilized by the addition of from 0.05 to 0.5% by weight, based on the total emulsion, of a high molecular weight water-soluble homopolymer or copolymer of acrylic acid, methacrylic acid, acrylamide or methacrylamide.

9 Claims, No Drawings

ANTIFOAMS BASED ON OIL-IN-WATER EMULSIONS

German Pat. No. 2,157,033 discloses a process for defoaming aqueous systems by means of emulsions which contain $C_{12}$–$C_{22}$-alkanols and/or $C_{12}$–$C_{22}$-fatty acid esters of dihydric or trihydric alcohols and paraffin oil and/or $C_{12}$–$C_{22}$-fatty acids as antifoams, and added amounts of conventional surfactants as emulsifiers. The emulsified water-insoluble substances have a mean particle size of from 4 to 9 $\mu$m. The conventional antifoam emulsions have the disadvantage that they cream during storage and in some cases even become so thick that they can then no longer be pumped.

It is an object of the present invention to stabilize conventional antifoams based on oil-in-water emulsions so that they are still capable of being pumped even after prolonged storage.

We have found that this object is achieved, in accordance with the invention, by antifoams based on oil-in-water emulsions in which the oil phase of the emulsion contains (a) a $C_{12}$–$C_{26}$-alcohol, distillation residues which are obtained in the preparation of alcohols having a fairly high carbon number by an oxo synthesis or by the Ziegler process and which may furthermore be oxyalkylated, and/or (b) a fatty acid ester of a $C_{12}$–$C_{22}$-carboxylic acid with a monohydric, dihydric or trihydric $C_1$–$C_{18}$-alcohol, with or without (c) a hydrocarbon having a boiling point above 200° C. or fatty acids of 12 to 22 carbon atoms, constitutes from 15 to 60% by weight of the emulsion and has a mean droplet size of from 0.5 to 15 $\mu$m, if the oil-in-water emulsions contain from 0.05 to 0.5% by weight of a high molecular weight water-soluble homopolymer or copolymer of acrylic acid, methacrylic acid, acrylamide or methacrylamide as a stabilizer.

The components (a) of the oil-in-water antifoam emulsions are, in particular, natural or synthetic alcohols of 12 to 26 carbon atoms, or mixtures of these. Examples are myristyl alcohol, cetyl alcohol and stearyl alcohol. The synthetic alcohols, which are obtainable, for example, by oxidation of aluminum-alkyls by the Ziegler process, are saturated straight-chain alcohols. Synthetic alcohols are also obtained by the oxo synthesis, this method generally giving mixtures of alcohols. Furthermore, distillation residues obtained in the preparation of the abovementioned alcohols by an oxo synthesis or by the Ziegler process can be used as component (a) of the oil phase of the antifoam emulsions. Other suitable components (a) of the said phase include oxyalkylated distillation residues which can be obtained in the above process for the preparation of higher alcohols by the oxo synthesis or by the Ziegler process. The oxyalkylated distillation residues are obtained by reacting the above distillation residues with ethylene oxide or propylene oxide or with a mixture of these. Not more than 5 ethylene oxide or propylene oxide groups, preferably 1 or 2 ethylene oxide groups, are added per OH group of the alcohol in the distillation residue.

A fatty acid ester of a $C_{12}$–$C_{22}$-carboxylic acid with a monohydric, dihydric or trihydric $C_1$–$C_{18}$-alcohol is used as component (b) of the oil phase of the antifoam emulsions. The fatty acids from which the esters are derived are, for example, lauric acid, myristic acid, palmitic acid, stearic acid, arachic acid and behenic acid, palmitic acid or stearic acid preferably being used. The stated carboxylic acids can be esterified using monohydric $C_1$–$C_{18}$-alcohols, eg. methanol, ethanol, propanol, butanol, hexanol, decanol or stearyl alcohol, dihydric alcohols, such as ethylene glycol, or trihydric alcohols, such as glycerol. The polyhydric alcohols can be completely or partially esterified.

The oil phase of the antifoam emulsions contains component (a) or component (b), or a mixture of these. Components (a) and (b) can be used in any ratio for the preparation of the antifoams. For example, mixtures of (a) and (b) which contain from 40 to 60% by weight of (a) and from 60 to 40% by weight of (b) have proven useful in practice.

The oil phase of the emulsion can additionally contain a further class of water-insoluble compounds, which are referred to below as component (c). The oil phase of the antifoam emulsions can contain as much as 50% by weight of the compounds of component (c). They can be added either to a mixture of the components (a) and (b) or to any of the compounds stated under (a) or (b). Suitable components (c) are hydrocarbons having a boiling point higher than 200° C. and a pour point of below 0° C., and fatty acids of 12 to 22 carbon atoms. Preferred hydrocarbons are paraffin oils, such as the commercial paraffin mixtures, which are also referred to as white oil. Other suitable components (c) are fatty acids from which the fatty acid esters of component (b) are derived, ie. fatty acids of 12 to 22 carbon atoms.

The oil-in-water emulsions are prepared using the conventional surfactants, which have an HLB value of more than 6. These surfactants are emulsifiers for oil-in-water systems or are typical wetting agents, and the surfactants used can be anionic, cationic or non-ionic compounds. Anionic or non-ionic surfactants or mixtures of these types of surfactants are preferably employed. Examples of substances of the stated type are sodium salts and ammonium salts of higher fatty acids, such as ammonium oleate or stearate, oxyalkylated alkyl phenols, eg. nonylphenol or isooctylphenol, which are reacted with ethylene oxide in a molar ratio of from 1:2 to 1:50, and oxyethylated unsaturated oils, eg. the reaction products of 1 mole of castor oil and from 30 to 40 moles of ethylene oxide or the reaction products of 1 mole of sperm oil alcohol with from 60 to 80 moles of ethylene oxide. Other preferably used emulsifiers are sulfated oxyethylation products of nonylphenol or octylphenol which are present as sodium or ammonium salts of the corresponding sulfuric acid half esters. 100 parts by weight of the oil-in-water emulsion usually contain from 0.5 to 5 parts by weight of an emulsifier or mixture of emulsifiers.

The oil phase of the emulsion comprises from 15 to 60% by weight of the emulsion and has a mean droplet size of from 0.5 to 15 $\mu$m. Emulsions of this type are known. They are prepared by emulsifying from 15 to 60 parts by weight of the oil phase in from 85 to 40 parts by weight of water, using a commercial apparatus, eg. a disperser. If a component of the oil phase is solid at the particular temperature at which the procedure is carried out, it is first melted and then mixed with the other components. The oil-in-water emulsions can be produced at room temperature or at elevated temperatures, eg. from 60° to 100° C.

The oil-in-water emulsions described above are stabilized according to the invention by incorporating from 0.05 to 0.5, preferably from 0.09 to 0.2, % by weight, based on the emulsion, of a high molecular weight water-soluble homopolymer or copolymer of acrylic acid, methyacrylic acid, acrylamide or methacrylamide. The stabilizer is preferably added during the preparation of the emulsion, but it is also possible to stabilize an emulsion which has already been prepared by adding to it one of the possible polymers or a mixture of these. In this case, it is preferable to use water-in-oil dispersions of the stated polymers, which can very readily be dispersed homogeneously in the antifoam emulsion in the presence of the wetting agent contained in the emulsion. Suitable stabilizers are homopolymers, for example the homopolymers of acrylic acid, methacrylic acid, acrylamide and methacrylamide. It is also possible to use a mixture of two different homopolymers, for example homopolymers of acrylic acid and of acrylamide. Suitable copolymers contain, for example, from 95 to 30% by weight of acrylamide or methacrylamide and from 5 to 70% by weight of acrylic acid or methacrylic acid. These copolymers can contain, as copolymerized units, as much as 10% by weight of other ethylenically unsaturated monomers, eg. acrylates, methacrylates, acrylonitrile or vinyl acetate. Other suitable stabilizers are copolymers of from 40 to 90% by weight of acrylic or methacrylic acid and from 60 to 10% by weight of an acrylate or methacrylate of an alcohol of 1 to 4 carbon atoms. These copolymers, too, can be modified by incorporating other ethylenically unsaturated monomers, eg. acrylamide, methacrylamide, vinyl acetate, vinyl propionate, acrylonitrile, methacrylonitrile or hydroxyalkyl acrylates, as copolymerized units, in an amount of not more than about 20% by weight. The stated homopolymers and copolymers of acrylic acid, methacrylic acid, acrylamide and methacrylamide have a high molecular weight, which can be determined, for example, with the aid of the Fikentscher K value. These values are above 160, preferably from 170 to 290. The high molecular weight homopolymers and copolymers are water-soluble and are used in an amount of from 0.05 to 0.5, preferably from 0.1 to 0.3, % by weight, based on the antifoam emulsion, for stabilizing antifoams based on oil-in-water emulsions.

Immediately after their preparation, the antifoam emulsions have a viscosity of from 300 to 700 mPa.s. After storage for 6 months, the viscosity increases to about 2,000–3,000 mPa.s. However, the emulsions do not cream and can be poured, stirred and pumped. Compared with the conventional unstabilized antifoam emulsions, the tendency of the stabilized antifoam emulsions to thicken is suppressed to a surprisingly great extent. The effectiveness of the antifoams is maintained even after stabilization.

In order to defoam aqueous systems, the stabilized oil-in-water emulsions described above are added to the said systems in an amount such that about 0.02–0.5, preferably 0.05–0.3, part of the antifoam is employed per 100 parts by weight of a foam-forming substance. The antifoams stabilized according to the invention are used, for example, in paper-making, in paper coating slips, in the food industry, in the starch industry, in waste water treatment plants and in the cooking of sulfite pulp. Like the conventional antifoams, the stabilized ones can be used at both acidic and alkaline pH.

In the Examples, parts and percentages are by weight. The K values of the polymers were determined in 5% strength aqueous sodium chloride solutions at 20° C., in accordance with H. Fikentscher, Cellulosechemie 13 (1932), 58–64 and 71–74; $K = k.10^3$. The mean size of the oil phase droplets emulsified in the water was determined using a Coulter counter.

EXAMPLE 1

An oil-in-water antifoam emulsion whose oil phase comprised 32% by weight of the emulsion and had a mean droplet size of from 3 to 5 μm was prepared in a disperser. The oil phase consisted of the following components:
14 parts of a triester of glycerol with a $C_{16}$–$C_{18}$-fatty acid,
10 parts of a mixture of $C_{16}$–$C_{20}$-fatty alcohols,
6 parts of mineral oil,
2 parts of an emulsifier (an adduct of 25 moles of ethylene oxide with 1 mole of isooctylphenol was reacted with sulfuric acid to give the sulfuric acid half ester) and
0.15 part of a copolymer of 70% of acrylamide and 30% of acrylic acid (K value 270).

16 parts of water and the emulsifier stated above were initially taken, and the remaining components were then added. Finally, aqueous sodium hydroxide solution was added to bring the pH of the emulsion to 9. The resulting oil-in-water emulsion had a viscosity of 450 mPa.s at 20° C. immediately after its preparation.

In order to check the stability of the emulsion, a sample was subjected to 3,000 rpm for 10 minutes in a laboratory centrifuge. The amount of water which had settled out was then determined. This was found to be 3%, based on the oil-in-water emulsion.

COMPARATIVE EXAMPLE 1

Example 1 was repeated, with the exception that the stabilizer (copolymer of 70% of acrylamide and 30% of acrylic acid) was omitted. The viscosity of the emulsion after its preparation was 400 mPa.s. When the stability of the emulsion was checked in the laboratory centrifuge under the conditions stated in Example 1, the amount of water which settled out was found to be 34%, based on the oil-in-water emulsion.

EXAMPLE 2

70 parts of water and 2 parts of an emulsifier (an adduct of 25 moles of ethylene oxide with 1 mole of isooctylphenol, esterified with sulfuric acid to give the corresponding sulfuric acid half ester) were initially taken in a disperser, and
16 parts of a mixture of $C_{16}$–$C_{18}$-fatty alcohols,
5 parts of mineral oil,
11 parts of a distillation residue from the oxosynthesis and
0.6 part of a copolymer of 60% of acrylamide and 40% of acrylic acid (K value 250)
were then added. The components were homogenized at 90° C. to give an oil-in-water antifoam emulsion whose organic phase had a droplet size of from 3 to 8 μm. The viscosity of the antifoam emulsion directly after its preparation was 500 mPa.s.

COMPARATIVE EXAMPLE 2

Example 2 was repeated, with the exception that the acrylamide/acrylic acid copolymer used as a stabilizer was omitted. The resulting oil-in-water emulsion had a viscosity of 400 mPa.s. at 20° C. immediately after its preparation. The droplet size of the organic phase was from 3 to 8 μm. When the stability was checked by the method stated in Example 1, the extent of creaming measured was 35%.

EXAMPLE 3

67 parts of water and 2 parts of an emulsifier (an adduct of 40 moles of ethylene oxide with 1 mole of castor oil) were initially taken in a disperser, and were processed with 24 parts of a $C_{16}$–$C_{18}$-alcohol fraction,
10 parts of beef tallow and
0.6 part of a 50% strength water-in-oil emulsion of a copolymer of 60% of acrylamide and 40% of acrylic acid (K value 260)

to give an oil-in-water emulsion. Homogenization was carried out at 80° C. to give a stable oil-in-water emulsion whose organic phase had a mean droplet size of from 4 to 10 μm. The viscosity of the emulsion at 20° C. was 800 mPa.s. immediately after its preparation, and increased to 2,000 mPa.s after storage for 6 months. The emulsion was still pumpable after this time.

COMPARATIVE EXAMPLE 3

Example 3 was repeated, with the exception that the stabilizer (a copolymer of acrylamide and acrylic acid) was omitted. In the resulting oil-in-water emulsifion, the mean droplet size of the organic phase was from 4 to 10 μm. The viscosity of the emulsion at 20° C. was 700 mPa.s immediately after its preparation, and increased to more than 10,000 mPa.s after storage for 6 months. This mixture could no longer be pumped.

We claim:

1. An antifoam in the form of an oil-in-water emulsion in which the oil phase constitutes from 15 to 60% by weight of the emulsion and has a mean droplet size of from 0.5 to 15 μm, and in which the oil phase comprises (a) a material selected from the group consisting of a $C_{12}$–$C_{26}$-alcohol or an alcohol distillation residue thereof obtained by the oxosynthesis or the Ziegler process, which may be further oxyalkylated, (b) a fatty acid ester of a $C_{12}$–$C_{22}$-carboxylic acid with a monohydric, dihydric or trihydric $C_1$–$C_{18}$-alcohol, and (c) mixtures thereof, said oil-in-water emulsion containing from 0.05 to 0.5% by weight, based on the weight of the oil-in-water emulsion, of a high molecular weight, water-soluble polymer selected from the group consisting of homopolymers and copolymers of acrylic acid, methacrylic acid, acrylamide and methacrylamide, as a stabilizer.

2. The antifoam of claim 1, wherein said oil-in-water emulsion contains from 0.1 to 0.3% by weight of said stabilizer.

3. The antifoam of claim 1, wherein said oil-in-water emulsion contains from 0.1 to 0.3% by weight of said stabilizer which is a copolymer of from 95–30% by weight of acrylamide or methacrylamide and from 5–70% by weight of acrylic acid or methacrylic acid.

4. The antifoam of claim 1, wherein said oil-in-water emulsion contains as said stabilizer, a copolymer of from 40–90% by weight of acrylic acid or methacrylic acid and from 60–10% by weight of an acrylate or methacrylate of a $C_1$–$C_4$ alcohol.

5. The antifoam of claim 1, wherein the oil phase of said emulsion contains a hydrocarbon which has a boiling point above 200° C. or a fatty acid of 12–22 carbon atoms.

6. The antifoam of claim 5, wherein said hydrocarbon is paraffin oil.

7. The antifoam of claim 1, wherein from 0.09 to 0.2% by weight of said stabilizer is incorporated in said oil-in-water emulsion.

8. The antifoam of claim 1, wherein said oil-in-water emulsion further comprises an anionic, cationic or nonionic surfactant.

9. The antifoam of claim 8, wherein a 100 part by weight quantity of said oil-in-water emulsion contains from 0.5 to 5 parts by weight of said surfactant.

* * * * *